United States Patent
Tei

(10) Patent No.: US 6,816,643 B2
(45) Date of Patent: Nov. 9, 2004

(54) WAVELENGTH TUNABLE DEMULTIPLEXING FILTER DEVICE, WAVELENGTH TUNABLE MULTIPLEXING FILTER DEVICE, AND WAVELENGTH ROUTING DEVICE

(75) Inventor: Masataka Tei, Kasugai (JP)

(73) Assignee: Santec Corporation, Komaki (JP)

( * ) Notice: Subject to any disclaimer, the term of this patent is extended or adjusted under 35 U.S.C. 154(b) by 187 days.

(21) Appl. No.: 10/133,638

(22) Filed: Apr. 29, 2002

(65) Prior Publication Data

US 2003/0068123 A1 Apr. 10, 2003

(30) Foreign Application Priority Data

Oct. 10, 2001 (JP) ........................................ 2001-312430

(51) Int. Cl.$^7$ ................................................ G02B 6/26
(52) U.S. Cl. ............................. 385/24; 385/14; 385/25
(58) Field of Search ............................. 385/14, 15, 24, 385/25

(56) References Cited

U.S. PATENT DOCUMENTS

| | | | | |
|---|---|---|---|---|
| 5,305,402 A | * | 4/1994 | Hill et al. ....................... | 385/25 |
| 6,198,857 B1 | * | 3/2001 | Grasis et al. ................... | 385/24 |
| 6,285,504 B1 | * | 9/2001 | Diemeer ....................... | 359/578 |
| 6,320,996 B1 | * | 11/2001 | Scobey et al. ................. | 385/18 |
| 6,377,372 B1 | * | 4/2002 | Yanagi ......................... | 398/79 |
| 6,389,188 B1 | * | 5/2002 | Scobey et al. ................. | 385/18 |
| 6,580,845 B1 | * | 6/2003 | Holmes ........................ | 385/16 |

FOREIGN PATENT DOCUMENTS

| | | |
|---|---|---|
| JP | 10-093505 A | 10/1998 |
| JP | 11-027239 A | 1/1999 |

OTHER PUBLICATIONS

J. S. Patel and Y. Siberberg, Liquid Crystal and Grating–Based Multiple–Wavelength Cross–Connect Switch, IEEE Photonics Technology Letters, May 1995, pp. 514–516, vol. 7, No. 5, IEEE, Red Bank, NJ, USA.

H.G. Limberger et al., Wideband Tuneable Fibre Bragg Grating Filters, European Conference on Optical Communications (ECOC) 1999, Sep. 1999, pp. 156–159, ECOC, Nice, France.

* cited by examiner

Primary Examiner—Ellen E. Kim
(74) Attorney, Agent, or Firm—Smith Patent Office

(57) ABSTRACT

Filter chips, each of which has a wavelength characteristic corresponding to each wavelength component of wavelength-multiplexed light, are mounted on a transparent substrate to make an optical filter element. When wavelength-multiplexed light is input to the optical filter element via an optical fiber, the transmission and reflection characteristics vary depending upon which filter chip the light enters. The input position of the light to the optical filter element is changed by moving it in a direction that the filter chips are arranged, so that different selection characteristics can be obtained.

21 Claims, 16 Drawing Sheets

F I G. 7
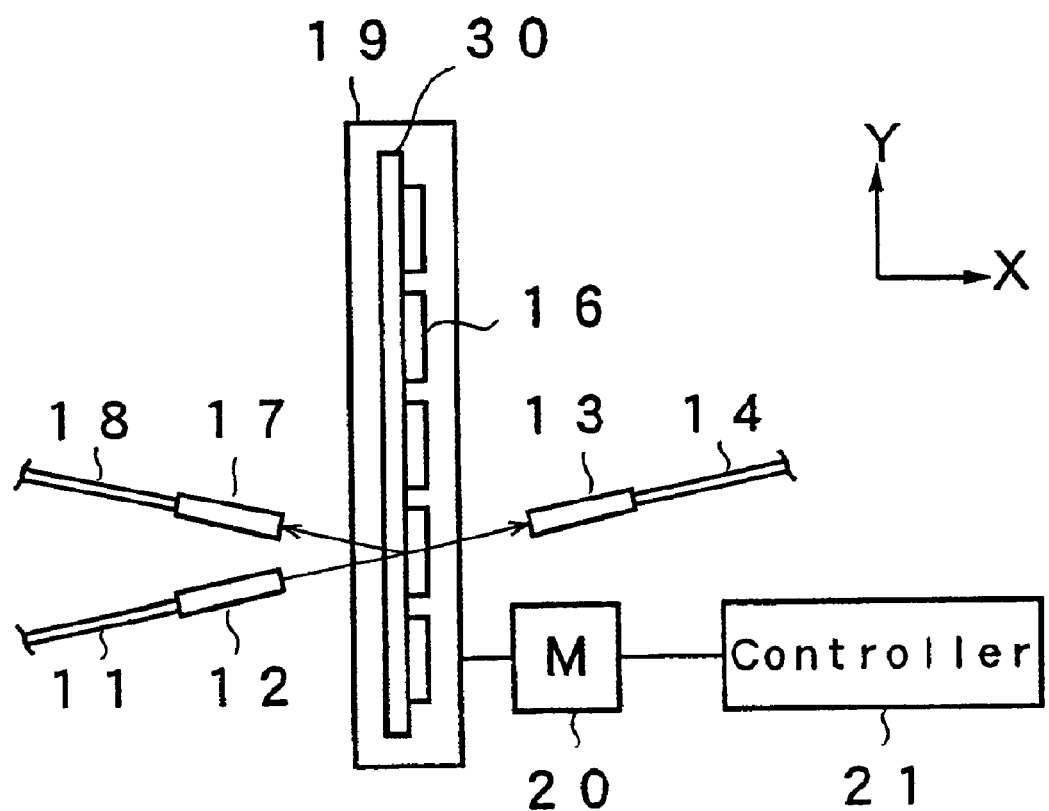

WAVELENGTH TUNABLE DEMULTIPLEXING FILTER DEVICE, WAVELENGTH TUNABLE MULTIPLEXING FILTER DEVICE, AND WAVELENGTH ROUTING DEVICE

BACKGROUND OF THE INVENTION

1. Field of the Invention

The present invention relates to a wavelength tunable demultiplexing filter device, wavelength tunable multiplexing filter device and wavelength routing device which are used for adding and dropping wavelength components (add-drop) in an optical network system so as to demultiplex and multiplex light of arbitrary wavelengths from optical signals.

2. Discussion of the Related Art

With the progress of technologies used for optical wavelength multiplexing division and transmission in optical communication systems, a more versatile and more flexible optical transmission system has been required. In an optical transmission system, light of a desired wavelength must be picked up from an optical signal where wavelengths have been multiplexed at an arbitrary node, or light of a desired wavelength must be added to such optical signals to send them as wavelength domain multiplexed light.

FIG. 1 illustrates the configuration of a conventional four-channel optical add-drop system. In this figure, wavelength-multiplexed light is added to an optical demultiplexing filter device 101 and then the desired wavelengths, for example, $\lambda 1$, $\lambda 2$, $\lambda 3$, and $\lambda 4$ are demultiplexed from the multiplexed wavelengths $\lambda 1$ through $\lambda n$. Light of the demultiplexed wavelengths goes to optical switches 102$a$ through 102$d$. Signals of newly modulated wavelengths $\lambda 1$ through $\lambda 4$ simultaneously enter the optical switches 102$a$ through 102$d$, respectively. The optical switches 102$a$ through 102$d$ have two input terminals and two output terminals. They select the signals demultiplexed by the optical demultiplexing filter device 101 and the newly modulated signals of $\lambda 1$ through $\lambda 4$ based on external control signals, and then output them from the two output terminals. The output from each of the optical switches is given to a multiplexing filter device 105 via optical tunable attenuators 103$a$ through 103$d$ and splitting devices 104$a$ through 104$d$. The splitting devices 104$a$ through 104$d$ extract some of the output from the optical tunable attenuators 103$a$ through 103$d$ and then output it to a monitor 106. The intensities of wavelengths are adjusted at the same level by controlling the output from the optical tunable attenuators via the monitor 106.

For such a conventional optical demultiplexing filter device, the selected wavelengths are previously fixed at $\lambda 1$ through $\lambda 4$. The number of channels will increase to dozens or several hundred in the near future. This will require multiplexing or demultiplexing light on that number of channels when arbitrary wavelengths are to be selected. For this reason, when an arbitrary channel is selected, all the channels must be temporarily disassembled and then the necessary channel must be selected from them. This causes disadvantages in making the scale of the communication system larger and increasing the transmission losses. At ordinary transmission nodes other than those using optical cross connections in a large-scaled matrix, the ability to select optical signals on several channels is good enough for the purposes of routing, add-drop, and it is desired that arbitrary wavelengths can be selected from a number of channels unlike the conventional fixed wavelengths.

SUMMARY OF THE INVENTION

The present invention has been made with attention given to the conventional problems. Accordingly, it is an object of the invention to provide a wavelength tunable demultiplexing filter device, wavelength tunable multiplexing filter device, and wavelength routing device which are used at transmission nodes or the like in a wavelength-multiplexed optical transmission system in order to select arbitrary wavelengths.

The wavelength tunable demultiplexing filter device of the invention demultiplexes arbitrary wavelength components from wavelength-multiplexed light and comprises an optical filter element including a plurality of filter chips arranged thereon which transmit at least one wavelength component of the wavelength-multiplexed light; a light emitting unit which emits the wavelength-multiplexed light into the optical filter element from a specific direction; a first light receiving unit which is located on the same optical axis as the light emitting unit and receives the light transmitted through the optical filter element; a moving unit which moves the optical filter element in a direction that the filter chips are arranged so that the light from the light emitting unit enters another filter chip; and a controller which controls the moving unit in accordance with a wavelength component to be demultiplexed.

The wavelength tunable multiplexing filter device of the invention is used to multiplex wavelength-multiplexed light from which an arbitrary wavelength component is filtered, with the filtered wavelength component, and comprises an optical filter element which has a plurality of filter chips arranged thereon which transmit at least one of wavelength components of the wavelength-multiplexed light; a first light emitting unit which emits light having arbitrary wavelength components of the wavelength-multiplexed light into the optical filter element from a specific direction; a second light emitting unit which emits wavelength-multiplexed light excluding the wavelength components emitted by the first light emitting unit, into a position of the optical filter element, where the transmitted component of the first light emitting unit through the optical filter element is outputted so that light reflected by the filter chip overlaps with the transmitted component of the light from the first light emitting unit; a light receiving unit located on the same optical axis as the first light emitting unit and receives the light outputted from the optical filter element and the light reflected from the second light emitting unit; a moving unit which moves the optical filter element in a direction that the filter chips are arranged to input the light from the first and second light emitting units into different filter chips; and a controller which controls the moving unit in accordance with at least one wavelength component to be multiplexed.

The routing device of the invention is provided with at least one pair of the wavelength tunable demultiplexing filter device and the wavelength tunable multiplexing filter device, and the routing device demultiplexes at least one of wavelength components from wavelength-multiplexed light and multiplexes the same wavelength components as the demultiplexed one with the residual wavelength-multiplexed light.

BRIEF DESCRIPTION OF THE DRAWINGS

The above and other objects and features of the present invention will be clearly understood from the following description with respect to the preferred embodiment thereof when considered in conjunction with the accompanying drawings and diagrams, in which:

FIG. 7 schematically illustrates a configuration of a wavelength tunable demultiplexing filter device according to a second embodiment of the present invention.

DETAILED DESCRIPTION OF THE PREFERRED EMBODIMENTS (Embodiment 1)

Figure 1:
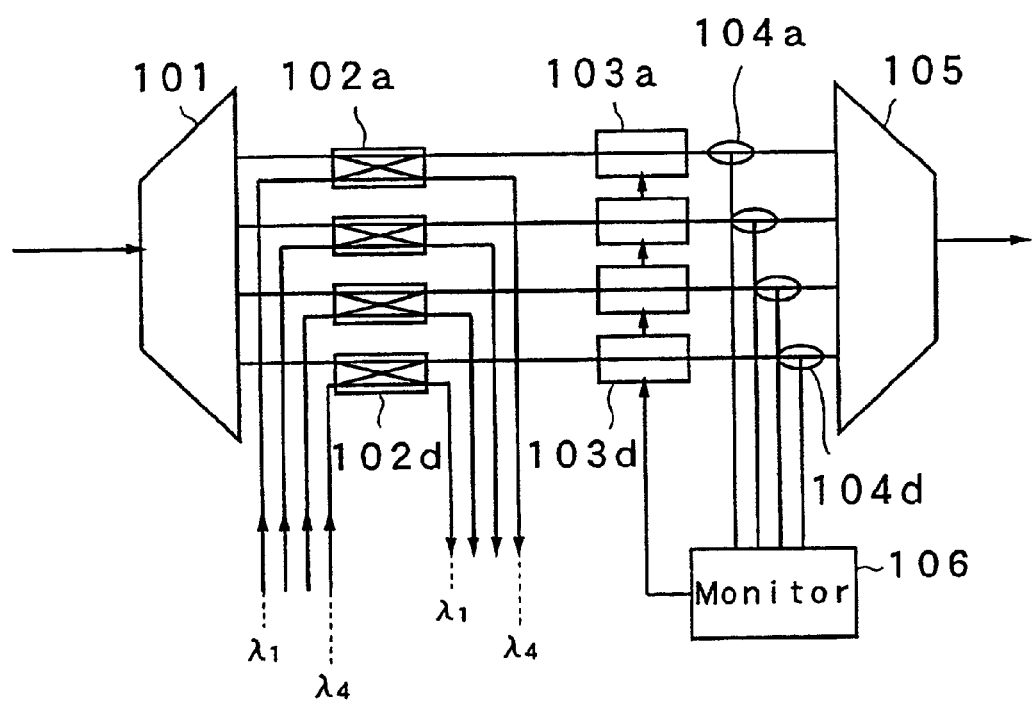
FIG. 1 is a block diagram illustrating the configuration of a conventional wavelength tunable multiplexing and demultiplexing filter device according to the prior art.
Figure 2:
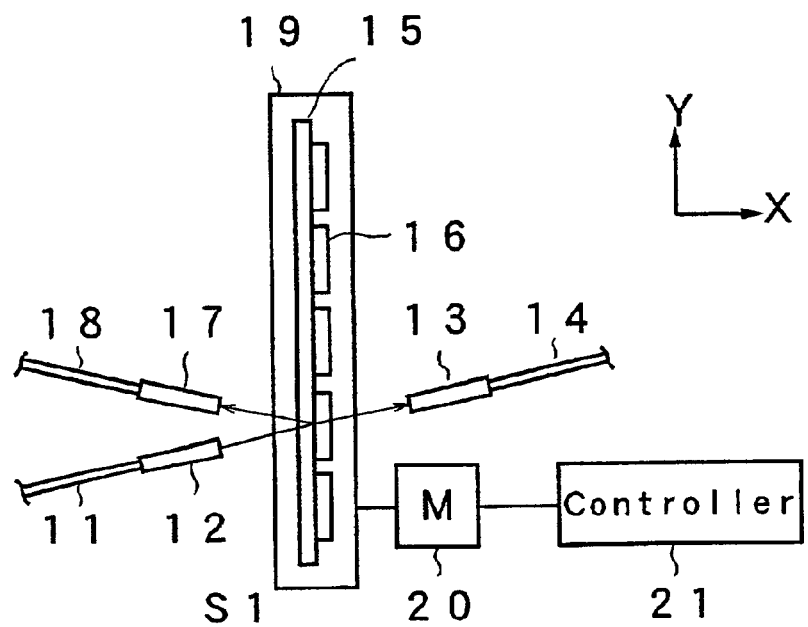
FIG. 2 schematically illustrates the configuration of a wavelength tunable demultiplexing filter device according to a first embodiment of the present invention.

FIG. 2 is a schematic illustration showing the configuration of a wavelength tunable demultiplexing filter device according to a first embodiment of the present invention. In the illustration, wavelength domain multiplexed signal light of wavelengths $\lambda 1$ through $\lambda n$ enter the wavelength tunable demultiplexing filter device. An optical fiber 11 for inputting the light is connected to a collimate lens 12. The collimate lens 12 is used to convert the input light into parallel light beams of specific width. On its optical axis, a collimate lens 13 for receiving light is provided. An optical fiber 14 is connected to the collimate lens 13. An optical filter element 15 is provided between the collimate lenses 12 and 13 so that the input light is slightly inclined from a line perpendicular to a longitudinal axis of the optical filter element 15.

Figure 4:
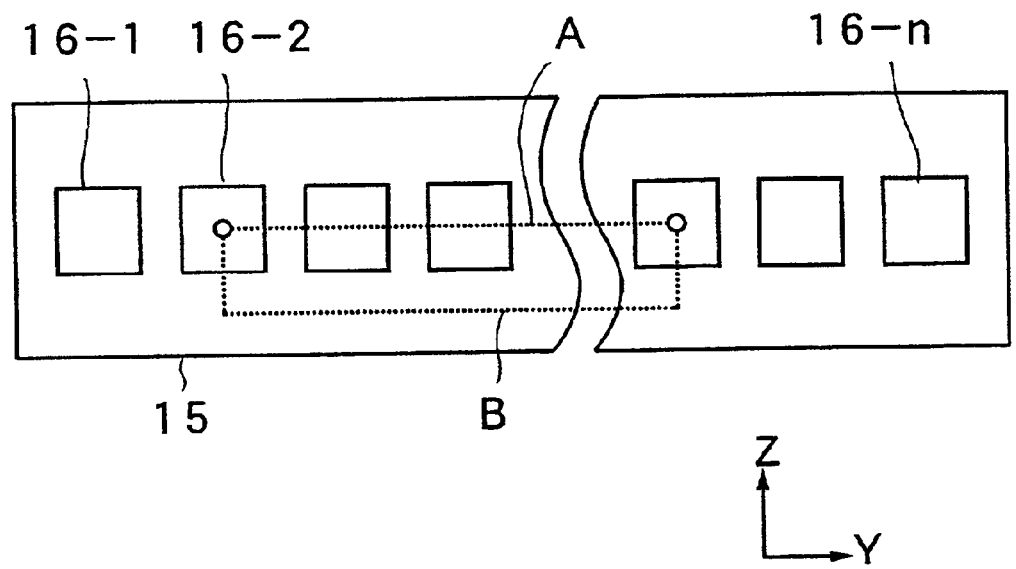
FIG. 4 is a front view illustrating the relation between an optical filter element and the input position of light according to the first embodiment of the present invention.

The optical filter element 15 as used in this embodiment, for example, has many filter chips 16-1 through 16-$n$ laid out at equal intervals on a surface of a glass plate. The glass plate is a rectangular transparent flat substrate as illustrated in FIG. 4. The filter chips 16-1 through 16-$n$ are interference light filters which have a dielectric multi-layer created by alternately layering dielectric film with a high refractive index, for example, $Ta_2O_5$ (refractive index $n_H=2.1$) and a dielectric film with a low refractive index, for example, $SiO_2$ (refractive index $n_L=1.4$). Each dielectric layer is alternately layered on the substrate by an ion beam sputter method, an ion-assisted vapor deposition method, an ion plating method, or other methods known in the art. The thickness $d_H$ of the dielectric layer with a high refractive index and the thickness $d_L$ of the dielectric layer with a low refractive index meet the following equations, respectively:

$$d_H = \lambda/4n_H$$

$$d_L = \lambda/4n_L$$

where λ is transmission wavelength at each filter chip for a band pass filter. The multi-layer structure of the filter chip includes a cavity layer which is used to make the filter flat on top. It is preferable that the cavity layer be of double or triple cavities.

Figure 5:
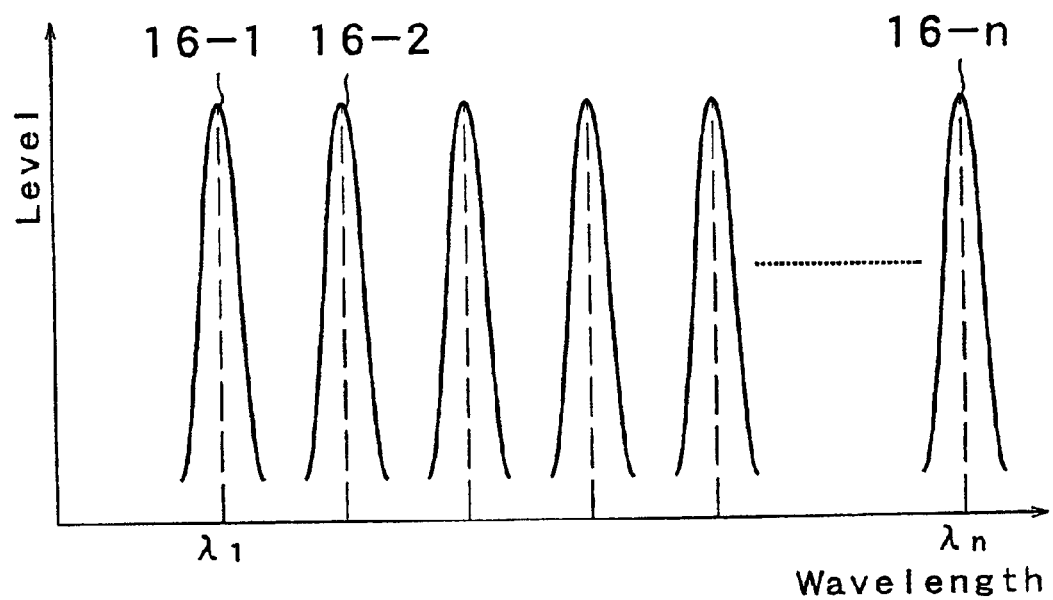
FIG. 5 illustrates the wavelength transmission characteristic of filter chips for the optical filter element according to the first embodiment of the present invention.

FIG. 5 illustrates the selection characteristic of each of the filter chips 16-1 through 16-n. Each filter chip shall have a characteristic corresponding to λ1 through λn of the incoming wavelength-multiplexed light. This means that the central wavelength of the filter chip 16-k is transmission wavelength λk (k=1 through n) and it is selected so that it becomes the wavelength of the wavelength domain multiplexed light.

In FIG. 2, a collimate lens 17 is provided in a position where the light reflected from the optical filter element 15 is received. An optical fiber 18 is connected to the collimate lens 17. In this example, the optical fiber 11 and the collimate lens 12 are used as a light emitting unit; and the collimate lens 13 and the optical fiber 14 as a first light receiving unit. The collimate lens 17 and the optical fiber 18 are used as a second light receiving unit. The optical filter element 15 is located on a linear slider 19 so that it can freely move along the direction where the filter chips are arranged (Y-axis). The linear slider 19 is connected to a moving unit 20 including a motor, and structured so that it can freely move in the Y-axis direction in the figure. The linear slider 19 can be moved by a mechanism comprising a rack and a pinion. In this case, the rack is formed on a lower surface of the linear slider 19 in the Y-axis direction, and the rack is engaged with the pinion not shown. The pinion is connected to the motor of the moving unit 20 through a speed-reducing mechanism. The linear slider 19 can be moved in the Y-axis direction by driving this pinion. A controller 21 is used to change the input position on the optical filter element 15 by moving the optical filter element 15 to a specific position via the moving unit 20 and to select the wavelength component of the inputted light.

Figure 6A:
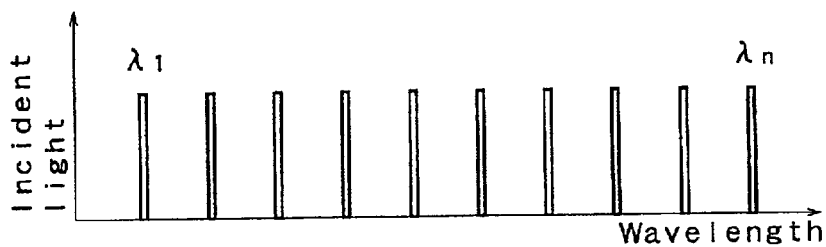
FIG. 6A is a wavelength spectrum of incoming light as in the first embodiment.
Figure 6B:
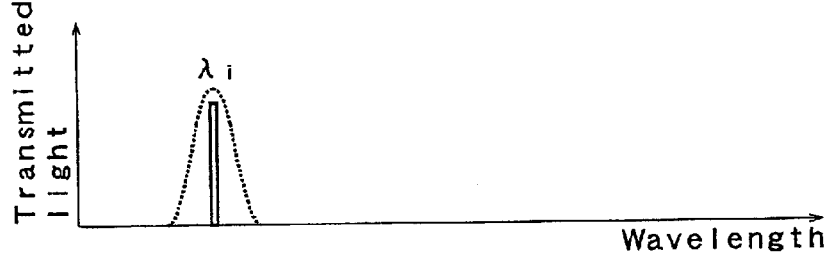
FIG. 6B is a wavelength spectrum of light that is transmitted through a filter chip.
Figure 6C:
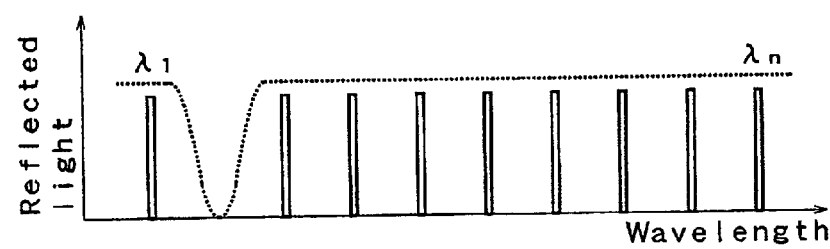
FIG. 6C is a wavelength spectrum showing reflected light in this case.

FIG. 6A shows wavelengths λ1 through λn of the wavelength-multiplexed light in the optical fiber 11 for input to the optical filter element 15. As illustrated in FIG. 2, only λi can be selected from the wavelength-multiplexed light in a position S1 where light enters the filter chip 16-i (i=2 in this case) of the optical filter element 15. In this position, as shown in FIGS. 6B and 6C, only λi is obtained from the optical fiber 14 for output light. Wavelength-multiplexed light of λ1 through λn except for λi is obtained at the optical fiber 18 by reflection. The dotted lines in FIGS. 6B and 6C show the transmission and reflection characteristics of the optical filter element 15 when it is in the position S1, respectively.

Figure 3:
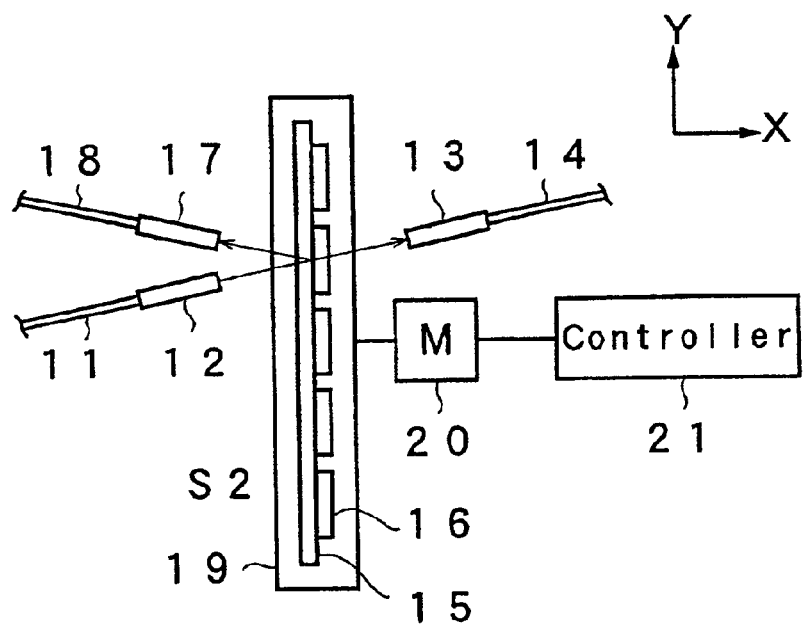
FIG. 3 schematically illustrates a state in which the wavelength tunable demultiplexing filer device has been moved.
Figure 6D:
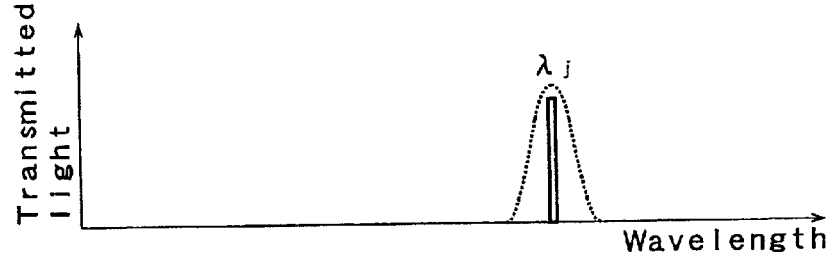
FIG. 6D is a wavelength spectrum of light which is transmitted through the filter chip when the filter element is moved.
Figure 6E:
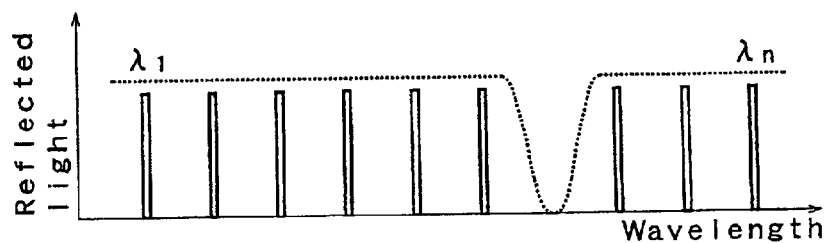
FIG. 6E is a wavelength spectrum showing the reflected light in this case.

When the optical signal of other wavelength λj is to be selected, as illustrated in FIG. 3, the optical filter element 15 is moved by operating the moving unit 20 via the controller 21. In this case, the input light enters a filter chip 16-j in a position S2. As shown in FIG. 6D, light of the corresponding wavelength λj is then obtained from the optical fiber 14 as output light. In FIG. 6E, wavelength-multiplexed light except for the one of wavelength λj is obtained from the optical fiber 18 by reflection. The dotted lines in FIGS. 6D and 6E show the transmission and reflection characteristics of the optical filter element 15 in the position S2, respectively. Thus, the optical signal of any arbitrary wavelength can be dropped by moving the optical filter element 15 via the controller 21.

In FIG. 4, if the optical filter element 15 is simply moved in the Y-direction, the input light will trace the dotted line A.

Therefore, the input light will sequentially moves through the filter chips 16-i to 16-j, and the selected wavelength will sequentially change from λi to λj, accordingly. To avoid this, the input position is temporarily shifted in the Z-axis direction as shown by a dotted line B indicating the trace of input light. After this shift has ensured that light is prevented from entering any filter chip, the input position is shifted in the Y-axis direction parallel to dotted line A. Subsequently, the input position may be shifted back again in the opposite direction of the Z-axis so that light enters the specific filter chip 16-j. In this case, the Y-axis and X-axis directions are the first and second directions, respectively.

In this case, light of wavelength λi primarily enters the optical fiber 14, but subsequently light of all wavelengths including λi will be temporarily prevented from entering the optical fiber 14. Then light of wavelength λj will enter the optical fiber 14. On the other hand, light of all wavelengths except for λi primarily enters the optical fiber 18, but subsequently light of all wavelength including λj temporarily will enter the fiber 18. Then light of all wavelengths except for λj will enter the fiber 18.

Unlike the case in which the input light is shifted along the dotted line A, the transmission wavelength will not sequentially change in a range between λi and λj, and therefore any malfunction involved in channel switching can be avoided. Thus, light of any arbitrary wavelength can be demultiplexed from wavelength-multiplexed light using a very simple configuration. This allows for configuring a flexible wavelength multiplex transmission system to meet each application.

(Embodiment 2)

The second embodiment of the present invention will now be described using FIGS. 7 through 11. In the second embodiment, the same symbols will be assigned to the same parts as in the first embodiment and the detailed description of those parts will be omitted.

Figure 8:
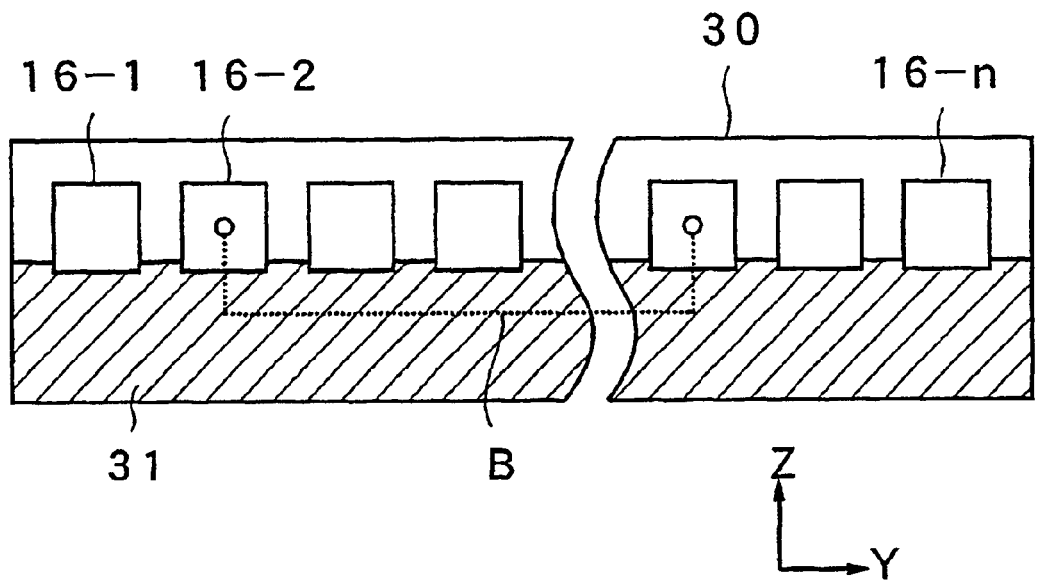
FIG. 8 is a front view illustrating the relation between an optical filter element and the input position of light according to the second embodiment of the present invention.

As illustrated in FIG. 7, the general configuration in the second embodiment is the same as in the first embodiment except that an optical filter element 30 is used instead of the optical filter element 15. As illustrated in FIG. 8, the optical filter element 30 comprises a glass plate which is a transparent flat substrate similar to the first embodiment. On the surface of the glass plate, a reflective membrane 31 is formed on the entire area from at least the central part in the longitudinal direction to the lower part as shown in the figure. The reflective membrane 31 reflects all of the input light regardless of its wavelength components. As in the first embodiment, many filter chips 16-1 through 16-n are laid out on the surface of the glass plate to make the optical filter element 30. The other portions of the configuration are the same as in the first embodiment.

Figure 9:
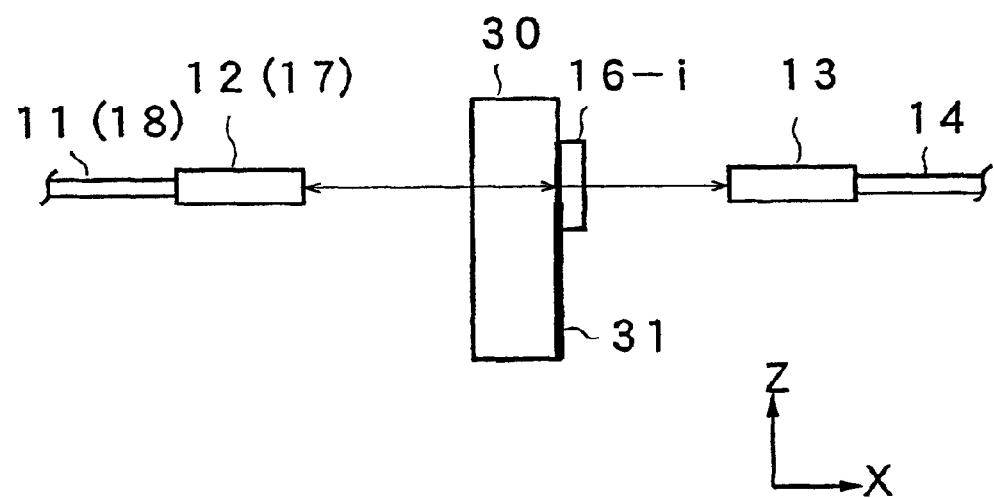
FIG. 9 illustrates the input state of light that enters the optical filter element of the wavelength tunable demultiplexing filter device according to the second embodiment of the present invention.
Figure 10:
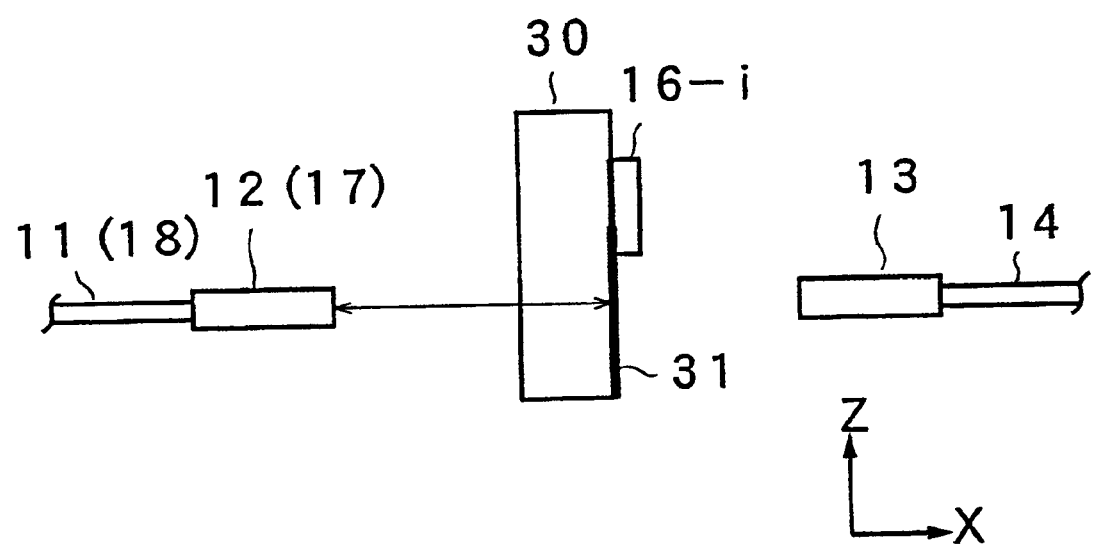
FIG. 10 illustrates the input state of light that enters the optical filter element of the wavelength tunable demultiplexing filter device according to the second embodiment of the present invention.
Figure 11A:
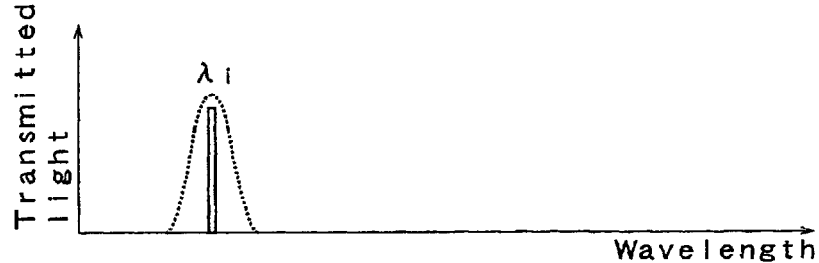
FIG. 11A is a wavelength spectrum showing the wavelength of light which is transmitted through a filter chip.
Figure 11B:
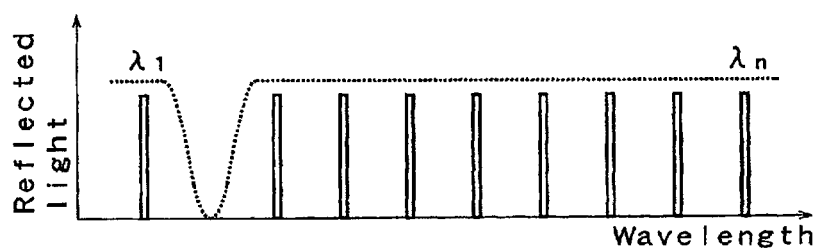
FIG. 11B is a wavelength spectrum showing the reflected light in this case.

In the second embodiment, the optical filter element 30 is moved not only in the Y-axis direction, but also in the Z-axis direction in order to change the position of light which enters the optical filter element 30. The optical filter element 30 is moved, for example, to the position where the wavelength-multiplexed light enters a filter chip 16 as illustrated in FIG. 9; and moved in the Z-axis direction as illustrated in FIG. 10 to the position where the input light is entirely reflected by the reflective membrane 31. FIGS. 11A and 11B show the state in which a certain wavelength, for example, λi is selected. In this state, a filter chip 16-i which transmits only λi from the wavelength-multiplexed light allows only the wavelength λi component to be obtained at an optical fiber 14, and the remaining wavelength components are reflected. FIG. 9 is a side view showing this state.

Figure 11C:
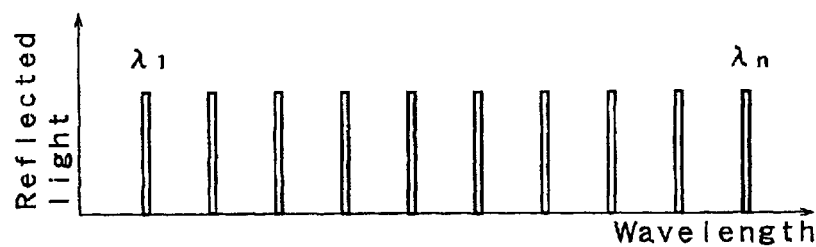
FIG. 11C is a wavelength spectrum showing the reflected light which is moving in the optical filter element.
Figure 11D:
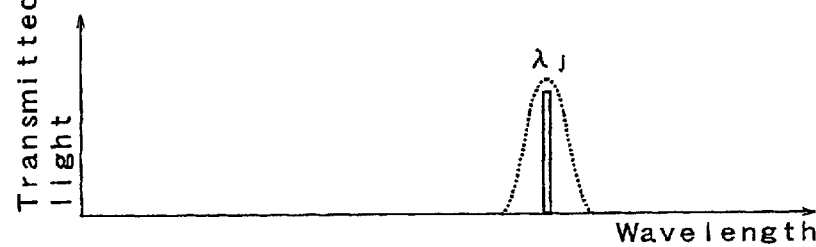
FIG. 11D is a wavelength spectrum of light which is transmitted through a filter chip located in another position.
Figure 11E:
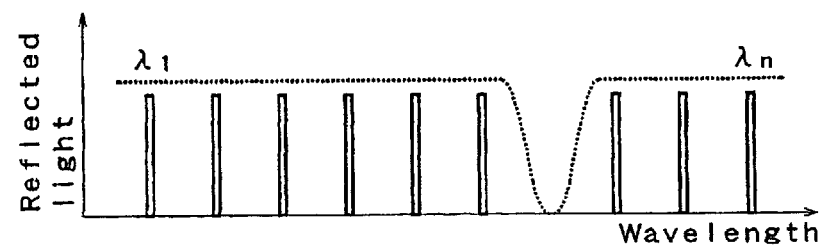
FIG. 11E is a wavelength spectrum showing the reflected light in this case.

When the selected wavelength is changed from λi to λj, the optical filter element 30 is temporarily moved in the Z-axis direction. As illustrated in FIG. 10, all the wavelength components will be reflected and then enter the optical fiber 18. FIG. 11C shows the state where all the wavelength components have been reflected by the reflective membrane 31 and were obtained at the optical fiber 18. In this case, the light does not enter the optical fiber 14. The optical filter element 30 is moved along a trace B in the Y-axis direction as shown in FIG. 8. After this movement has been completed, the optical filter element 30 is moved again in the Z-axis direction in reverse to let the wavelength-multiplexed light enter the filter chip 16-$j$. As shown in FIGS. 11D and 11E, this allows the wavelength $\lambda j$ component to be transmitted to the optical fiber 14 and results in obtaining the other wavelength components at the optical fiber 18 for reflection. Thus, the light does not stop when it changes in wavelength. In addition, the light does not pass through any unnecessary wavelength component filters. For this reason, the requirements of channel switching can be satisfied. In this case, the Y-axis and X-axis directions are the first and second directions, respectively.

In the present embodiment, the moving unit 20 moves the optical filter element 30 temporarily in the Z-axis direction. The moving unit may move the optical filter element 30 to a direction having a vertical component to the Y-axis direction in order to prevent the limited light from entering into any filter chips.

(Embodiment 3)

Figure 12:
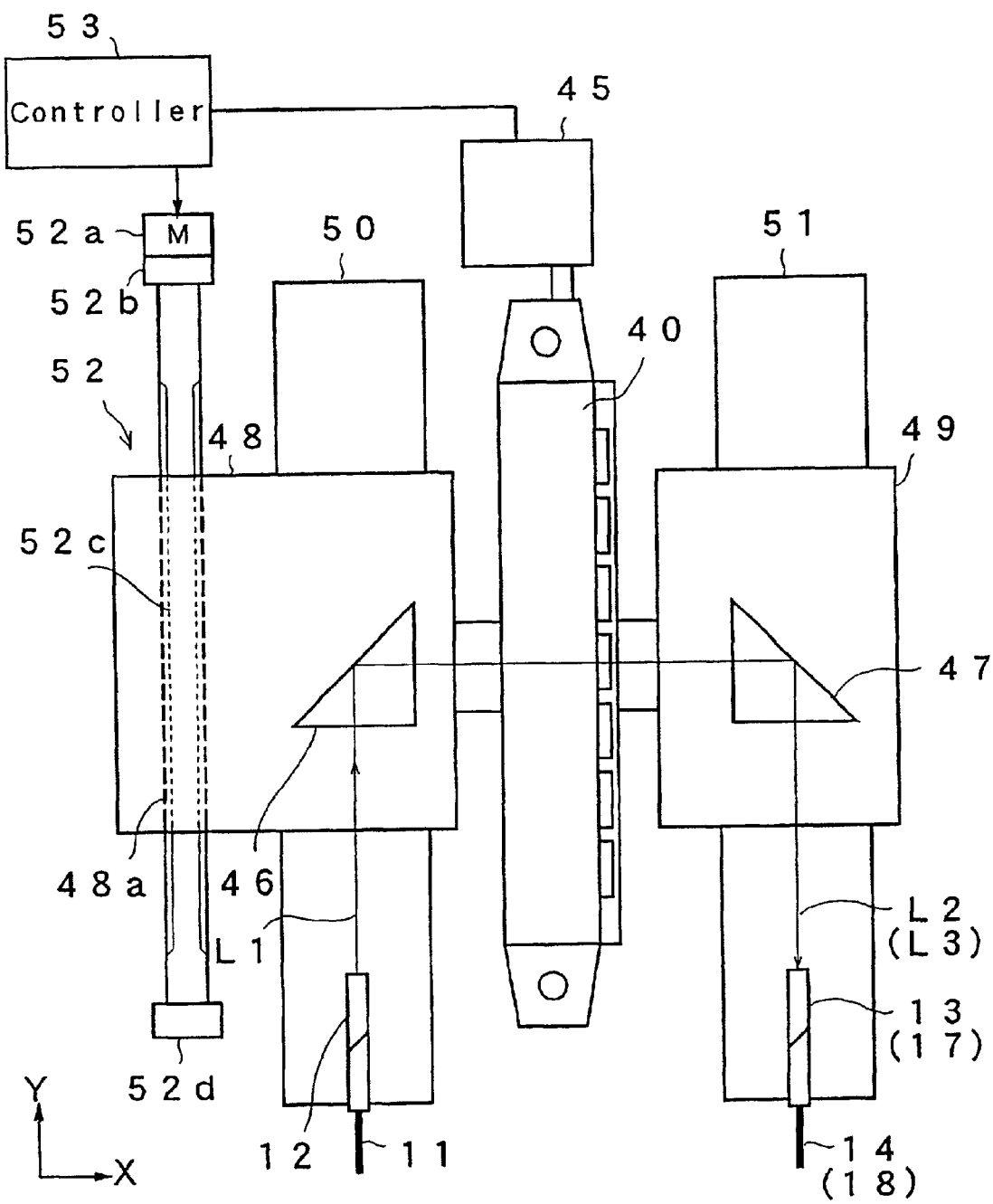
FIG. 12 schematically illustrates the configuration of a wavelength tunable demultiplexing filter device according to a third embodiment of the present invention.
Figure 13A:
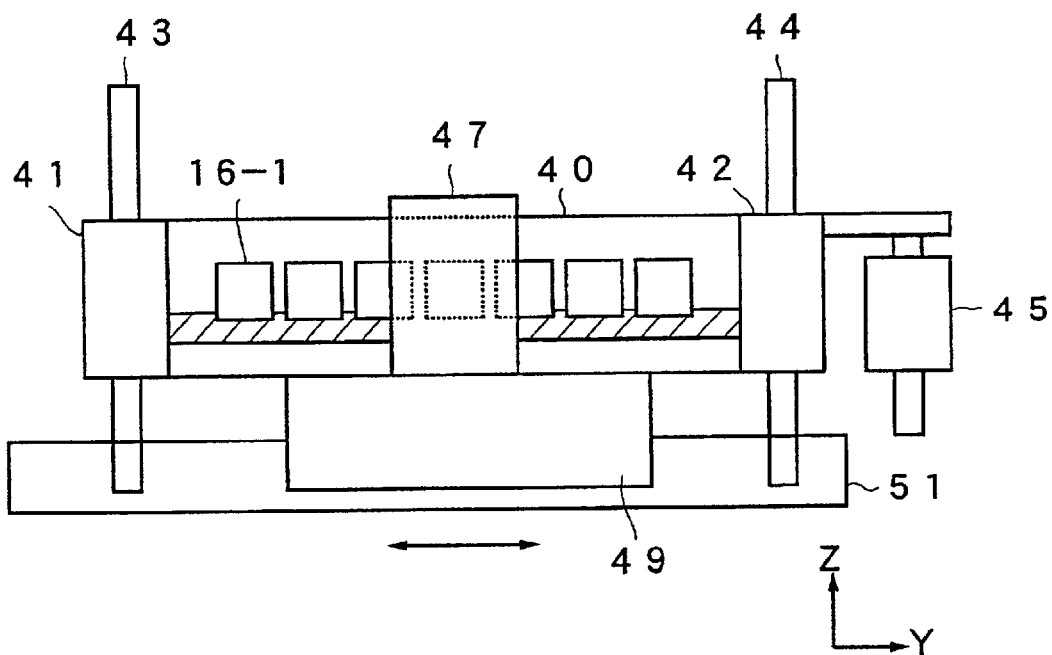
FIGS. 13A and 13B are side views illustrating the configuration of a wavelength tunable demultiplexing filter device according to the third embodiment of the present invention.
Figure 13B:
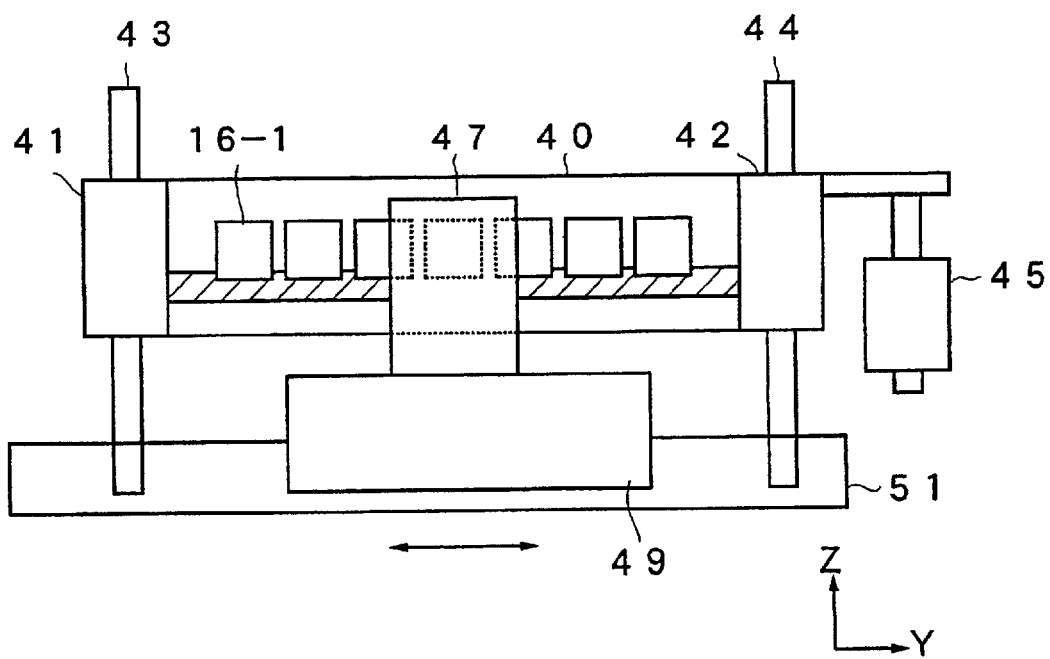

FIG. 12 illustrates the configuration of a wavelength tunable demultiplexing filter device as in a third embodiment of the invention. FIGS. 13A and 13B are side views of the device. In the third embodiment, an optical fiber 11 and a collimate lens 12 are used as a light emitting unit. A collimate lens 13 and an optical fiber 14 are used as a first light receiving unit. A collimate lens 17 and an optical fiber 18 are used as a second light receiving unit. In FIG. 12, the second light receiving unit is located just under the first one. An optical filter element 40 is provided between the light emitting unit and the two light receiving units. As illustrated in FIGS. 13A and 13B, the optical filter element 40 has bearings 41 and 42 on the left and right sides, respectively. The optical filter element 40 is supported by guide shafts 43 and 44 so that it can be freely moved a specific distance in the Z-axis direction. As described later, the optical filter element 40 is slightly inclined from the Z-axis. It can be moved in the Z-axis direction using an actuator 45 which comprises a linear motor, an electromagnet, and others.

As shown in FIG. 12, a prism 46 is provided in a position where the light from the optical fiber 11 is reflected to the optical filter element 40. A prism 47 is provided in an position where the reflected light and transmitted light as described later are sent to the collimate lenses 13 and 17, respectively. The prisms 46 and 47 are used to reflect the incoming and outgoing light in the vertical direction. The prisms 46 and 47 form reflecting units. These prisms are located on sliders 48 and 49, respectively. The sliders 48 and 49 are connected to each other below the optical filter element 40, and structured so that they can be freely and simultaneously moved in the Y-axis direction on bases 50 and 51. An actuator 52 is used to move the sliders 48 and 49 in the Y-axis direction. The bearings 41 and 42, the guide shafts 43 and 44, the actuators 45 and 52, the sliders 48 and 49, and the bases 50 and 51 are located in a moving unit which is used to move the optical filter element in the Y-axis and Z-axis directions. A controller 53 is used to control the actuators 45 and 52.

The actuator 52 includes a motor 52$a$, a reduction gear unit 52$b$, a lead screw 52$c$, and a holder 52$d$. The lead screw 52$c$ is rotatably held by the reduction gear unit 52$b$ and a holder 53$d$ at both ends thereof. The female screw 48$a$ is formed in the slider 48 and is engaged to the lead screw 52$c$.

The motor 52$a$ of the actuator 52 rotates the lead screw 52$c$ through the reduction gear unit 52$b$. Since the female screw 48$a$ is in engagement with the lead screw 52$c$, the slider 48 is driven in the Y-axis direction, and both sliders 48 and 49 can move in the Y-axis direction. As shown in FIGS. 13A and 13B, for example, the actuator 45 comprises a push-pull solenoid. If the push-pull solenoid is formed into a latch-type solenoid, it is possible to move the optical filter element 40 to two positions in the Z-axis direction by energizing the solenoid.

Figure 14:
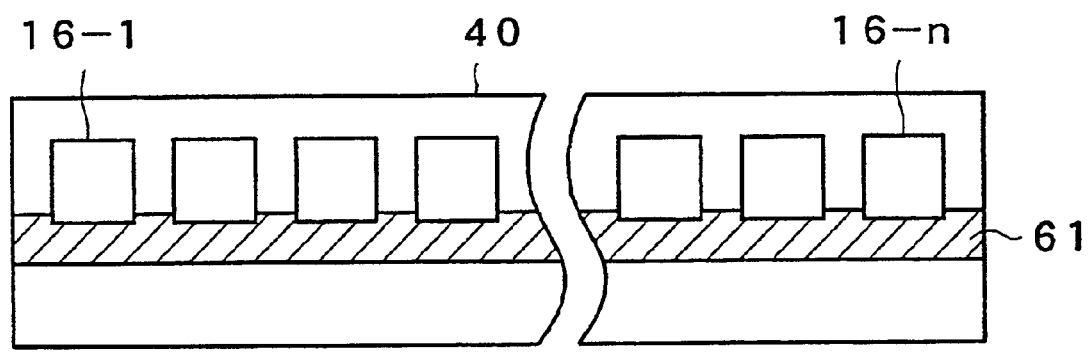
FIG. 14 is a front view of an optical filter element according to the third embodiment of the present invention.
Figure 15:
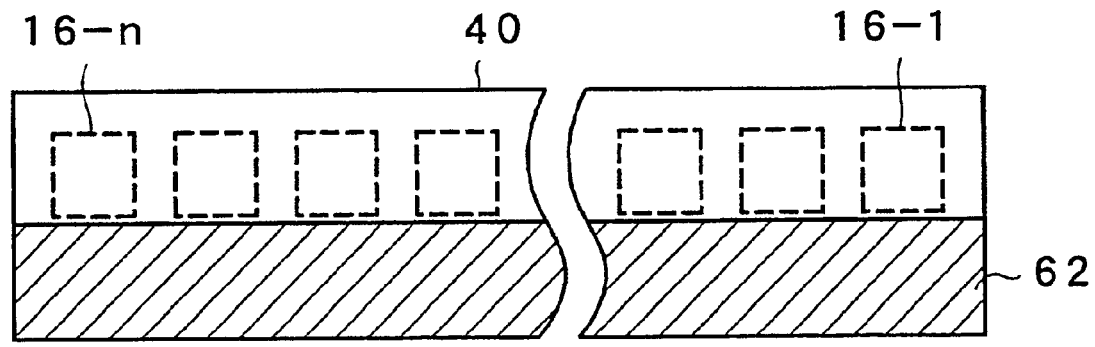
FIG. 15 is a rear view of the optical element according to the third embodiment of the present invention.

As illustrated in FIG. 14, the optical filter element 40 has a strip-like reflective surface 61 formed in the longitudinal direction on one side of a glass substrate which is a transparent flat plate. In positions contacting with the reflective surface, filter chips 16-1 through 16-$n$ as in the first and second embodiments are laid out as shown in the figure. As illustrated in FIG. 15, a reflective surface 62 is formed in the longitudinal direction on the lower half of the reverse side of the glass substrate.

Figure 16:
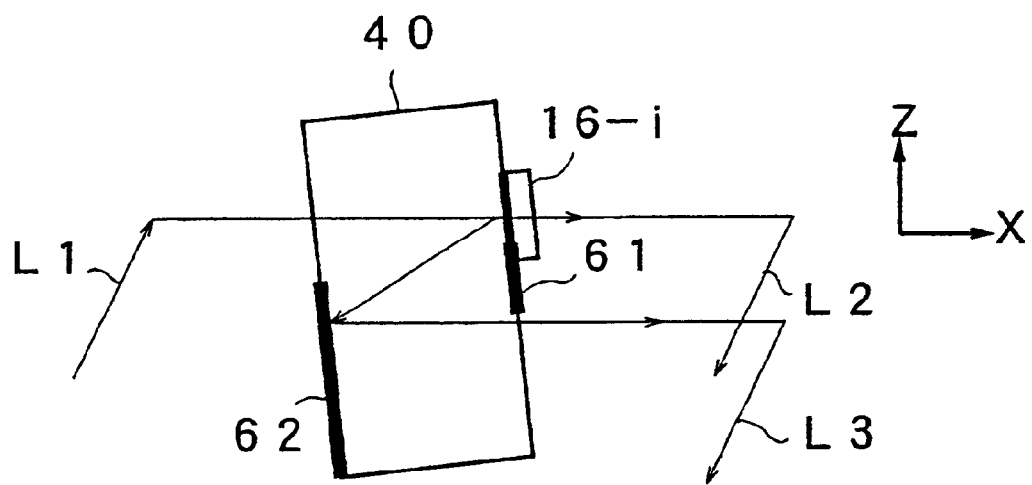
FIG. 16 illustrates the input state on an optical filter of the optical filter element for the wavelength tunable demultiplexing filter device according to the third embodiment of the present invention.

The operation of the third embodiment will now be described. As illustrated in FIG. 16, the input light from the optical fiber 11 passes through an optical axis L1 via the collimate lens 12 and is then reflected at the prism 46. In the state where the light enters the filter chip 16-$i$ on the optical filter element 40, only the wavelength $\lambda i$ component of the light passes through the filter chip 16-$i$ and is reflected at the prism 47. The light passes through the optical axis L2, and then enters the optical fiber 14. In this case, the components other than the $\lambda i$ component are reflected at the filter chip 16-$i$. As shown in FIG. 16, they are reflected again at the reflective surface 62 on the opposite side. They become parallel with the transmitted light of wavelength $\lambda i$, are transmitted through the glass substrate, and are then reflected by the prism 47. They go along the optical axis L3, pass through the collimate lens 17, and then enter the optical fiber 18. Thus, the light of wavelength $\lambda i$ can be demultiplexed. The position where the emitted light enters any one of the filter chips is referred to as a first position.

Figure 17:
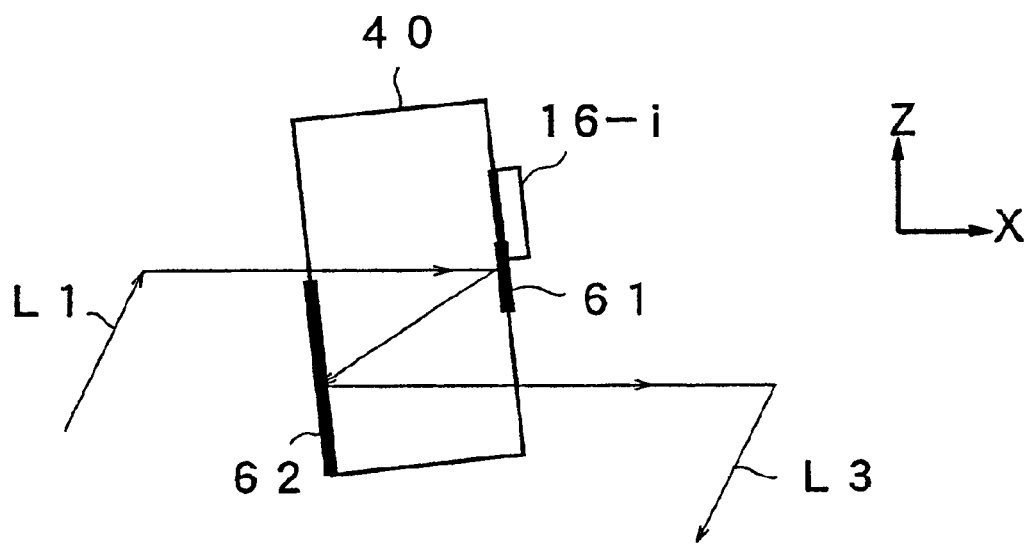
FIG. 17 illustrates the input state on the optical filter of the optical filter element for the wavelength tunable demultiplexing filter device according to the third embodiment of the present invention.

In this state, when the wavelength of the transmitted light is changed from $\lambda i$ to $\lambda j$, the actuator 45 is driven to move the optical filter element 40 in parallel with the guide shafts 43 and 44 in the Z-axis direction as illustrated in the figure. As shown in FIG. 17, the input light then enters the reflective surface 61 on the lower part of the filter chip 16-$i$. In this case, since all wavelength components of the light are reflected, they are returned to the inside of the optical filter element 40 and then are reflected again by the reflective surface 62 on the opposite side. Therefore, they are reflected at the prism 47 and all the reflected light enters the collimate lens 17 and the optical fiber 18 via the optical axis L3. In this state, the sliders 48 and 49 are moved in the Y-axis direction using the actuator 52. The position where the emitted light is reflected by the two reflective surfaces is referred to as a second position.

When the sliders 48 and 49 reach the position on the lower part of the filter chip 16-$j$, which permits the desired wavelength $\lambda j$ to pass through, they are stopped from moving in the Y-axis direction. Next, the optical filter element 40 is moved in the opposite direction of the Z-axis via the actuator 45. This causes the input light to enter the filter chip 16-$j$. As in the case shown in FIG. 16, only the wavelength $\lambda j$ component is transmitted and then obtained at the optical fiber 14 for output light via the prism 47. The wavelength components other than $\lambda j$ are reflected at the reflective surfaces 61 and 62 as in FIG. 16, and then they are obtained at the optical fiber 18 for output light via the prism 47. As in the second embodiment, this allows for changing the selected wavelength while ensuring that the wavelength-multiplexed light does not stop and that light of wavelengths between λi and λj does not sequentially enter the optical fiber 14.

In the first, second and third embodiments, many filter chips are aligned as optical filter elements on a flat plate. However, the optical filter element may be shaped like a ring to lay out the filter chips uniformly on such a ring surface. Alternatively, the optical filter element may be shaped like a disc to lay out filter chips radiately on such a disc surface. This allows for moving the optical filter element easily for the purpose of selecting a filter chip.

In the present embodiment, the moving unit moves the optical filter element 40 temporarily in the Z-axis direction. The moving unit may also move the optical filter element 40 to a direction having a vertical component in the Y-axis direction in order to prevent the limited light from entering into any filter chips.

(Embodiment 4)

The fourth embodiment is similar to the third embodiment except that the optical axes are moved in the Z-axis direction, and only the different portions will be explained. In the fourth embodiment, instead of moving the optical filter element 40 in the Z-axis direction by the above-described push-pull solenoid, the optical axes themselves are changed into the Z-axis direction.

Figure 18:
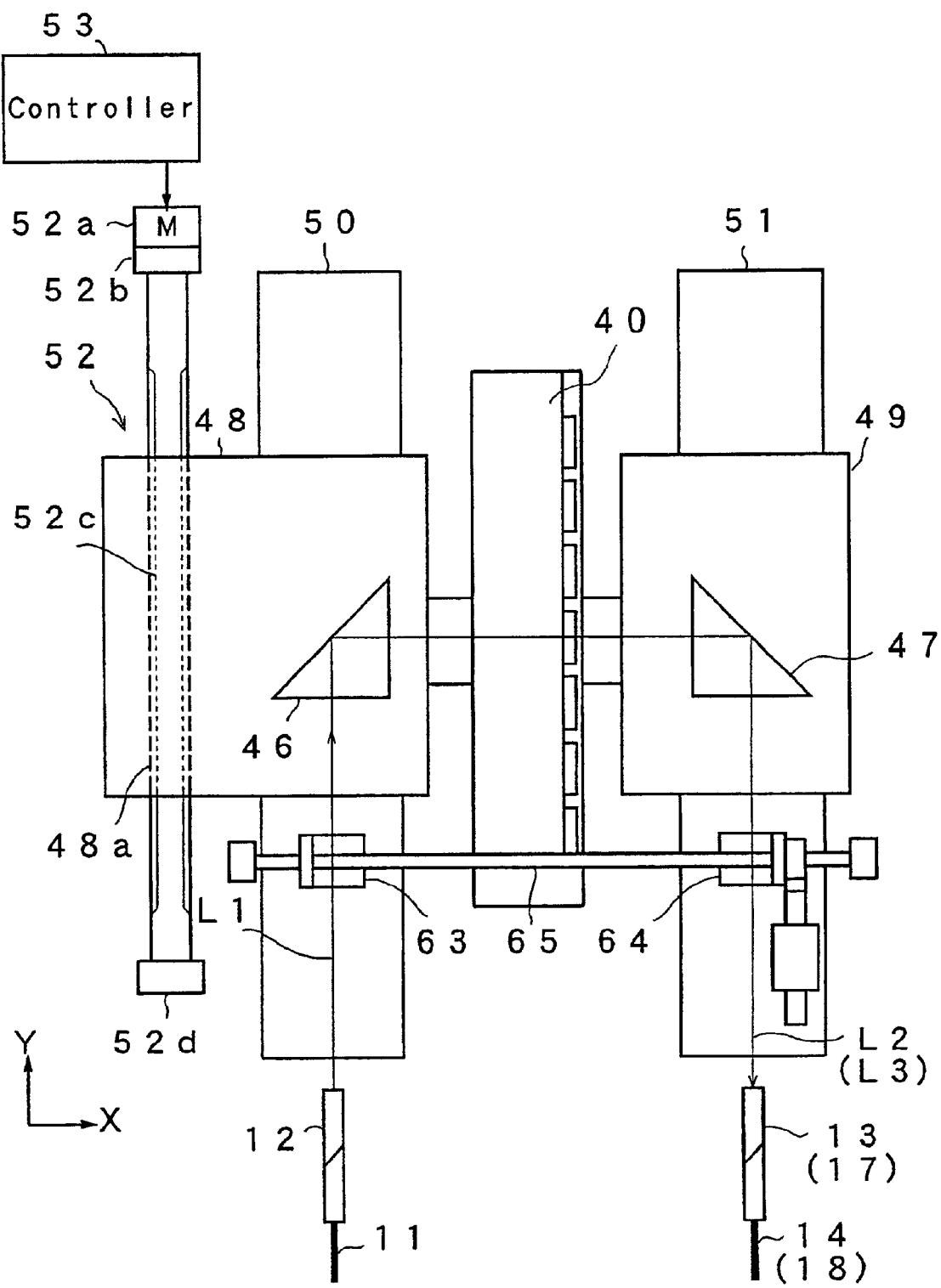
FIG. 18 is a top view illustrating the configuration of a wavelength tunable demultiplexing filter device according to the fourth embodiment of the present invention.
Figure 19:
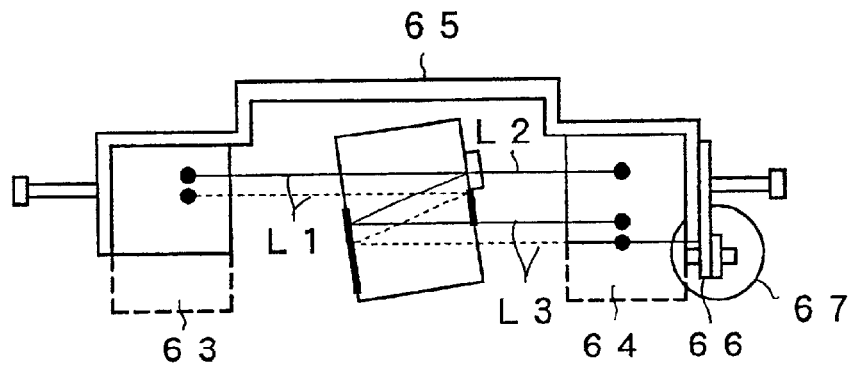
FIG. 19 is a side view illustrating the configuration of a wavelength tunable demultiplexing filter device according to the fourth embodiment of the present invention.
Figure 20:
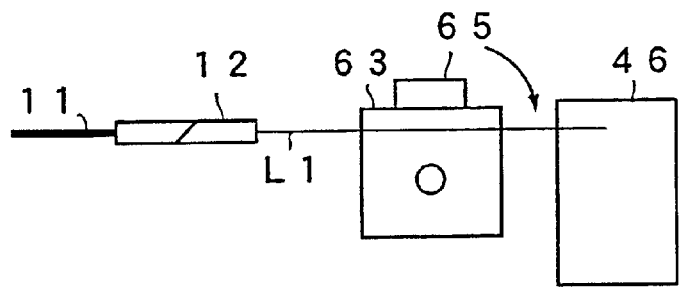
FIG. 20 is a side view of a light emitting element according to the fourth embodiment of the present invention.
Figure 21:
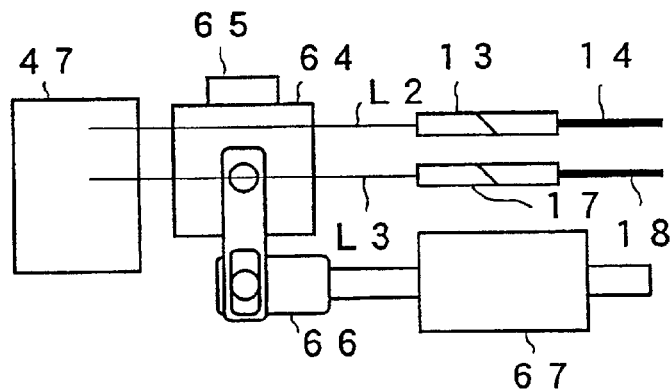
FIG. 21 is a side view of a light receiving element according to the fourth embodiment of the present invention.
Figure 22:
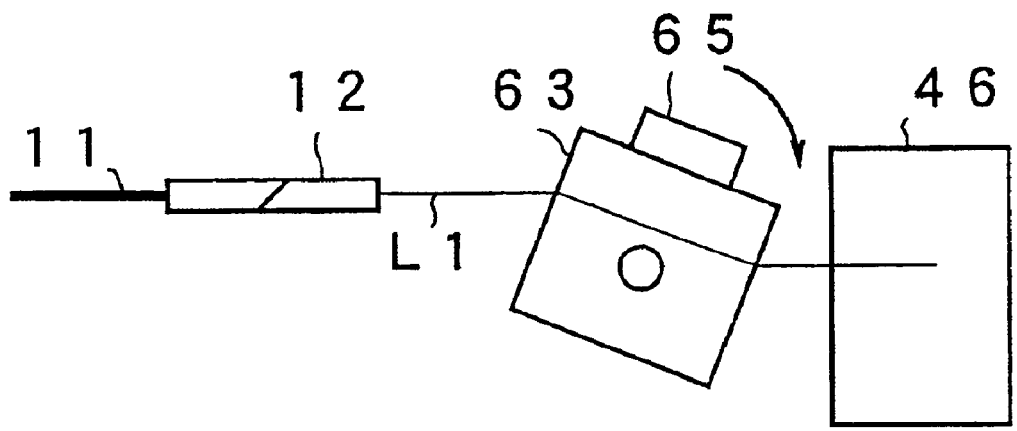
FIG. 22 is a side view of the light emitting element when a solenoid is driven according to the fourth embodiment of the present invention.
Figure 23:
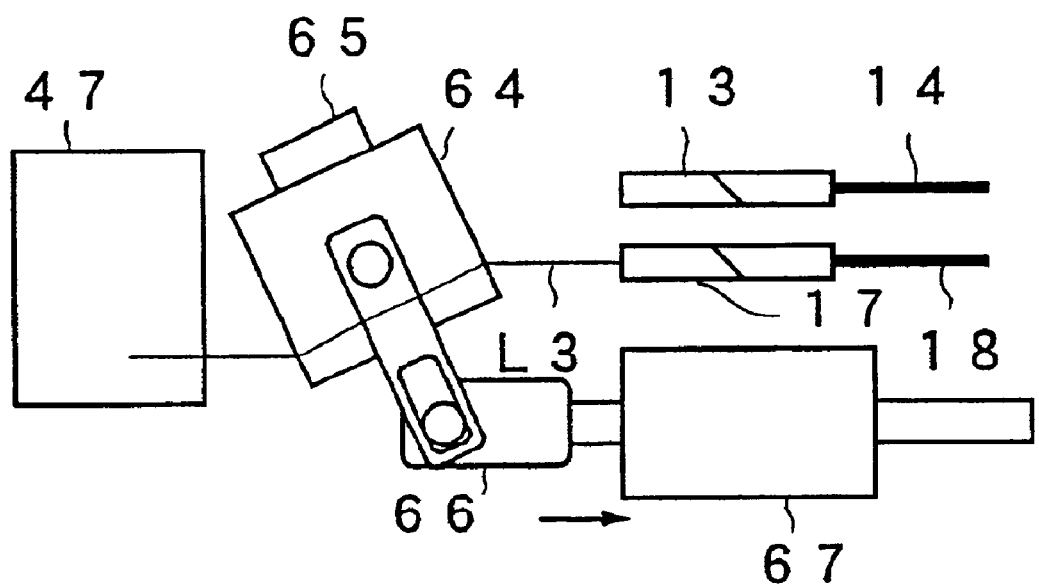
FIG. 23 is a side view of the light receiving element when the solenoid is driven according to the fourth embodiment of the present invention.

In FIG. 18, a prism 63 is provided on the optical axis L1 between the collimator 12 and the prism 46, and a prism 64 is provided on the optical axes L2 and L3 between the prism 47 and collimators 13 and 17. Each of the prisms 63 and 64 has a substantially rectangular solid shape and is rotatably held along its center axis. The center axes of the prisms 63 and 64 are coaxially provided. The prisms 63 and 64 are connected to each other by a connection bridge 65 shown in FIG. 19, and they rotate at the same time. The bridge 65 is formed into a crank-shape. A solenoid 67 is connected to one of the prisms, e.g., the prism 64 through a link mechanism 66. As shown in FIGS. 19, 20 and 21, the optical axis L1 passes through the prism 63 as it is and enters any of filter tips of the optical filter element 40 in a state in which the prism 64 is in parallel to the optical axis L1. As shown in FIGS. 19, 22 and 23, when the solenoid 67 is driven, the link 66 is moved in the direction of the arrow in the figures. The prism 64 rotates through a constant angle by the movement of the link 66. At that time, the prism 63 also rotates by the connection bridge 65. Therefore, as shown in FIG. 22, the optical axis L1 is shifted in parallel. At the same time, the optical axes L2 and L3 are also shifted as shown in FIG. 23. Therefore, it is possible to change the optical axis into the Z-axis direction without using the actuator 45 in the third embodiment, and the same function as that of the third embodiment can be realized.

(Embodiment 5)

Figure 24:
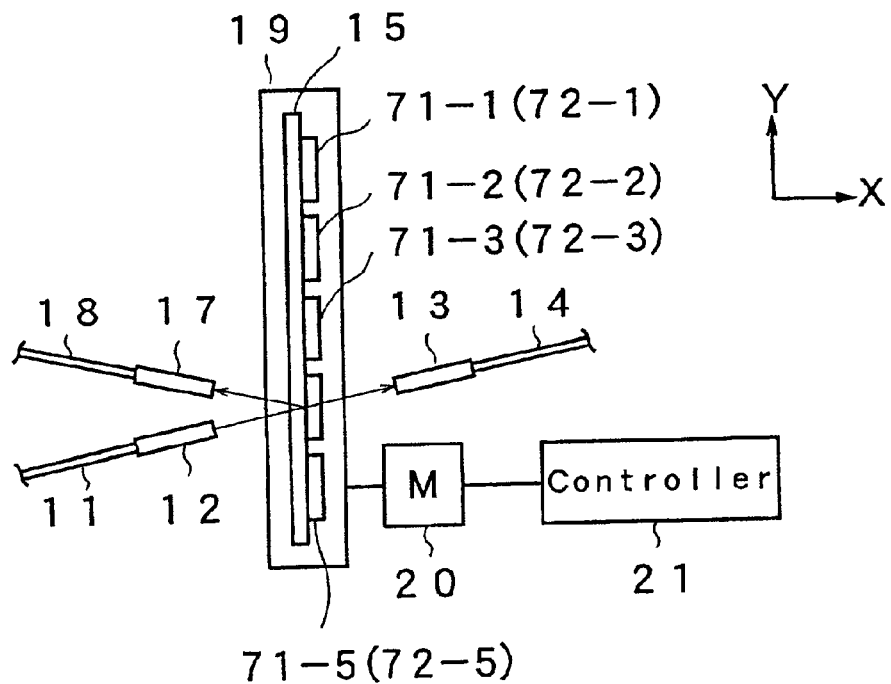
FIG. 24 schematically illustrates the configuration of a wavelength tunable demultiplexing filter device according to a fifth embodiment of the present invention.

The fifth embodiment of the present invention will now be described. The former embodiments use a filter chip which transmits each wavelength component of wavelength-multiplexed light. However, the filter chip may have such bandwidth that allows one or more wavelength components to be transmitted simultaneously. FIG. 24 schematically illustrates the configuration of the wavelength tunable demultiplexing filter device in the fifth embodiment. The same parts as in the first embodiment are given the same symbols and their detailed description has been omitted. Filter chips 71-1 through 71-n are used in demultiplexing an arbitrary wavelength. This means that the number of wavelengths of wavelength-multiplexed light to be demultiplexed by the filter chips can be specified as appropriate for each filter chip. For example, the filter chip 71-1 transmits the wavelengths of wavelength-multiplexed light λ1 through λ3, the filter chip 71-2 transmits the wavelengths of wavelength-multiplexed light λ4 through λ6, and the filter chip 71-3 simultaneously demultiplexes three wavelengths of wavelength-multiplexed light λ7 through λ9. The subsequent filter chip 71-4 also simultaneously demultiplexes each three consecutive wavelengths. This allows for demultiplexing multiple wavelengths with a relatively simple configuration.

The number of wavelengths of wavelength-multiplexed light which is to be demultiplexed by filter chips may be freely specified without restricting it to three wavelengths. For example, the filter chip 72-2 demultiplexes three wavelengths λ3 through λ5, and the filter chip 72-3 demultiplexes two wavelengths λ6 and λ7. This allows for freely demultilexing into desired wavelength components by changing the input position of wavelength-multiplexed light.

(Embodiment 6)

The sixth embodiment shows an wavelength tunable multiplexing filter device of the present invention.

In the first through fifth embodiments, when the optical fiber 11 for input and the optical fibers 14 and 18 for output light are inverted, that is, the optical fiber 14 is used for inputting wavelength λk, the optical fiber 18 for inputting wavelength-multiplexed light excluding the wavelength λk, and the optical filter 11 is used for outputting wavelength-multiplexed light. By such configuration, a wavelength tunable multiplexing filter device which adds a desired wavelength to wavelength-multiplexed light in the same optical system can be embodied. In this embodiment, an optical fiber 11 and a collimate lens 12 are used as a light receiving unit; and a collimate lens 13 and an optical fiber 14 are used as a first light emitting unit. Further, a collimate lens 17 and an optical fiber 18 are used as a second light emitting unit. In this case, the optical fiber 11 is used for outputting light and the signal in which all wavelengths including the wavelength λk are multiplexed will be obtained.

(Embodiment 7)

Figure 25:
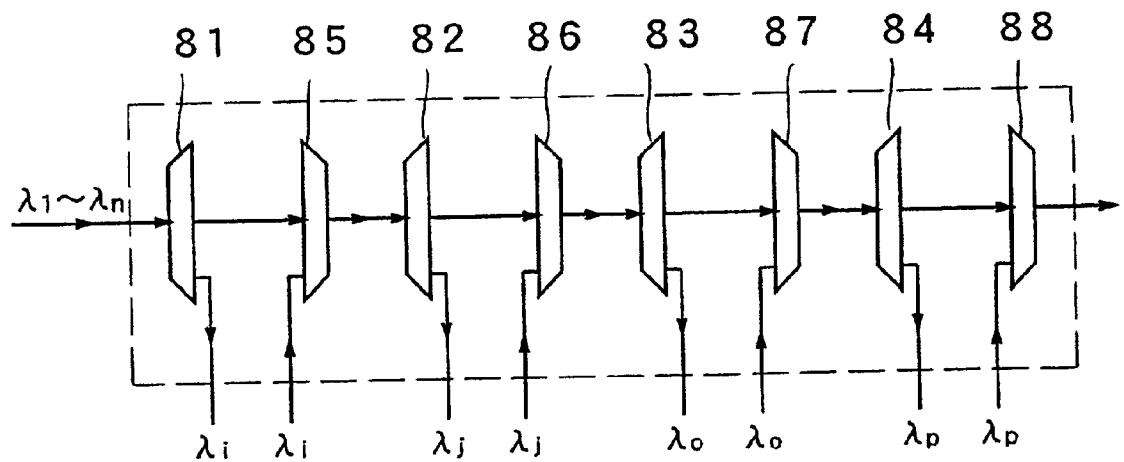
FIG. 25 schematically illustrates a wavelength routing device according to a seventh embodiment of the present invention.

FIG. 25 schematically illustrates a wavelength routing device which uses the wavelength tunable demultiplexing filter device and wavelength tunable multiplexing filter device. In this figure, 81, 82, 83, and 84 indicate wavelength tunable demultiplexing filter devices in one of the first through fifth embodiments, which allows the incoming wavelength-multiplexed light to be demultiplexed into arbitrary wavelengths λi, λj, λo, and λp (i, J, o, p=1 through n), respectively. The wavelength tunable multiplexing filter devices 85 through 88 are devices upon which lights with the demultiplexed wavelengths λi, λj, λ0, and λp and wavelength-multiplexed light excluding those wavelength are inputted and which multiplex the input light of the same wavelengths with other signal light. As described in the first through the fifth embodiments, these devices can be embodied by using them as wavelength multiplexing filter devices. When wavelength demultiplexing devices and wavelength multiplexing devices are alternatively connected, four arbitrary wavelengths can be demultiplexed at the demultiplexing filter devices. At the same time, the multiplexing filter devices can be outputted as wavelength-multiplexed light by multiplexing residual light with other signal light of the same wavelengths. Therefore, a wavelength routing device can be embodied using those wavelength tunable demultiplexing filter devices and wavelength tunable multiplexing devices. This allows for configuring a flexible wavelength multiplexing transmission system in accordance with specifications. It is therefore possible to add or drop arbitrary wavelengths and to exchange or route signals between different wavelengths.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

The text of Japanese priority application no. 2001-312430 filed on Oct. 10, 2001 is hereby incorporated by reference.

What is claimed is:

1. A wavelength tunable demultiplexing filter device which demultiplexes arbitrary wavelength components from wavelength-multiplexed light, comprising:

an optical filter element including a plurality of filter chips arranged thereon, each of said filter chips transmits a predetermined single wavelength component of the wavelength-multiplexed light;

a light emitting unit which emits the wavelength-multiplexed light into said optical filter element from a specific direction;

a first light receiving unit which is located on the same optical axis as said light emitting unit and receives the light transmitted through said optical filter element;

a moving unit which moves said optical filter element in a direction that said filter chips are arranged so that the light from said light emitting unit enters another filter chip; and a controller which controls said moving unit in accordance with a wavelength component to be demultiplexed.

2. A wavelength tunable demultiplexing filter device according to claim 1, further comprising:

a second light receiving unit which receives the light reflected by said optical filter element.

3. A wavelength tunable multiplexing filter device according to claim 1, wherein each of said filter chips transmits a different predetermined single wavelength.

4. A wavelength tunable demultiplexing filter device which demultiplexes arbitrary wavelength components from wavelength-multiplexed light, comprising:

an optical filter element including a plurality of filter chips arranged thereon which transmit at least one wavelength component of the wavelength-multiplexed light;

a light emitting unit which emits the wavelength-multiplexed light into said optical filter element from a specific direction;

a first light receiving unit which is located on the same optical axis as said light emitting unit and receives the light transmitted through said optical filter element;

a moving unit which moves said optical filter element in a first direction that said filter chips are arranged so that the light from said light emitting unit enters another filter chip; and a controller which controls said moving unit in accordance with a wavelength component to be demultiplexed, wherein said optical filter element has a reflective surface which each of said filter chips partially contacts; and said moving unit being disposed so as to move said optical filter element in the first direction and in a second direction having a vertical component relative to the first direction, whereby the wavelength-multiplexed light contacts said reflective surface of said optical filter element.

5. A wavelength tunable demultiplexing filter device according to claim 4, wherein each of said filter chips on said optical filter element transmits a plurality of wavelength components of the wavelength-multiplexed light.

6. A wavelength tunable demultiplexing filter device according to claim 4 further comprising:

a second light receiving unit which receives the light reflected by said optical filter element.

7. A wavelength tunable demultiplexing filter device according to claim 6, wherein each of said filter chips on said optical filter element transmits a plurality of wavelength components of said wavelength-multiplexed light.

8. A wavelength tunable multiplexing filter device according to claim 4, wherein each of said filter chips transmits a different predetermined single wavelength.

9. A wavelength tunable demultiplexing filter device which demultiplexes arbitrary wavelength components from wavelength-multiplexed light, comprising:

an optical filter element including a plurality of filter chips arranged thereon which transmit at least one wavelength component of the wavelength-multiplexed light;

a light emitting unit which emits the wavelength-multiplexed light into said optical filter element from a specific direction;

a first light receiving unit receives the light transmitted through said optical filter element;

a moving unit which moves said optical filter element in a first direction that said filter chips are arranged so that the light from said light emitting unit enters another filter chip;

a controller which controls said moving unit in accordance with a wavelength component to be demultiplexed; and a second light receiving unit which receives the light reflected by said optical filter element, wherein said optical filter element is structured on a transparent substrate having first and second surfaces; said first surface on which said filter chips are mounted has a reflective area partially contacting each of said filter chips; and said second surface opposite to said first surface has another reflective area;

said moving unit moves said optical filter element to a first position so that the wavelength multiplexed light can be input into one of said filter chips and reflect the resulting reflected light on said second surface and to a second position to reflect the input light on said first and second surfaces, said moving unit moves said optical filter element in the first direction and in a second direction having a vertical component relative to the first direction.

10. A wavelength tunable demultiplexing filter device according to claim 9, wherein each of said filter chips on said optical filter element transmits a plurality of wavelength components of the wavelength-multiplexed light.

11. A wavelength tunable demultiplexing filter device according to claim 10, further comprising:

reflecting units which reflect the wavelength-multiplexed light emitted by said light emitting unit and the light obtained through said optical filter element toward said first and second light receiving units;

wherein a second moving unit moves at least one of said reflecting units in the first direction and said first and second light receiving units and in a second direction having a vertical component relative to the first direction.

12. A wavelength tunable demultiplexing filter device according to claim 9, further comprising:

reflecting units which reflect the wavelength-multiplexed light emitted by said light emitting unit and the light obtained through said optical filter element toward said first and second light receiving units;

wherein a second moving unit moves at least one of said reflecting units in the first direction and said first and second light receiving units and in a second direction having a vertical component relative to the first direction.

13. A wavelength tunable multiplexing filter device according to claim 9, wherein each of said filter chips transmits a different predetermined single wavelength.

14. A wavelength tunable demultiplexing filter device which demultiplexes arbitrary wavelength components from wavelength-multiplexed light, comprising:

an optical filter element including a plurality of filter chips arranged thereon which transmit at least one wavelength component of the wavelength-multiplexed light;

a light emitting unit which emits the wavelength-multiplexed light into said optical filter element from a specific direction;

a first light receiving unit receives the light transmitted through said optical filter element;

a first moving unit which moves said optical filter element in a first direction that said filter chips are arranged so that the light from said light emitting unit enters another filter chip;

a controller which controls said moving unit in accordance with a wavelength component to be demultiplexed;

a second light receiving unit which receives the light reflected by said optical filter element, wherein reflecting units which reflect the wavelength-multiplexed light emitted by said light emitting unit and the light obtained through said optical filter element toward said first and second light receiving units; and wherein a second moving unit moves at least one of said reflecting units in the first direction and said first and second light receiving units and in a second direction having a vertical component relative to the first direction.

15. A wavelength tunable demultiplexing filter device according to claim 14, wherein each of said filter chips on said optical filter element transmits a plurality of wavelength components of the wavelength-multiplexed light.

16. A wavelength tunable multiplexing filter device according to claim 14, wherein each of said filter chips transmits a different predetermined single wavelength.

17. A wavelength tunable multiplexing filter device which multiplexes wavelength-multiplexed light from which arbitrary wavelength components have been filtered, with the filtered wavelength components, comprising:

an optical filter element which has a plurality of filter chips arranged thereon which transmit at least one of wavelength components of the wavelength-multiplexed light;

a first light emitting unit which emits light having arbitrary wavelength components of the wavelength-multiplexed light into said optical filter element from a specific direction;

a second light emitting unit which emits wavelength-multiplexed light excluding the wavelength components emitted by said first light emitting unit, into a position of said optical filter element, where the transmitted component of said first light emitting unit through said optical filter element is outputted so that light reflected by said filter chip overlaps with said transmitted component of the light from said first light emitting unit;

a light receiving unit located on the same optical axis as said first light emitting unit and receives the light outputted from said optical filter element and the light reflected from said second light emitting unit;

a moving unit which moves said optical filter element in a direction that said filter chips are arranged to input the light from said first and second light emitting units into different filter chips; and a controller which controls said moving unit in accordance with at least one wavelength component to be multiplexed.

18. A wavelength tunable multiplexing filter device according to claim 17, wherein said filter chips on said optical filter element transmit a plurality of wavelength components of said wavelength-multiplexed light.

19. A wavelength tunable multiplexing filter device according to claim 18, wherein said optical filter element has a reflective surface which each of said filter chips partially contacts, and said moving unit moves said optical filter element in a first direction relative to the filter chips and in a second direction having a vertical component to said first direction, whereby the lights emitted from said first and second light emitting units can be sent to said reflective surface of said optical filter element.

20. A wavelength tunable multiplexing filter device according to claim 17, wherein said optical filter element has a reflective surface which each of said filter chips partially contacts, and said moving unit moves said optical filter element in a first direction relative to the filter chips and in a second direction having a vertical component to said first direction, whereby the lights emitted from said first and second light emitting units can be sent to said reflective surface of said optical filter element.

21. A wavelength routing device having at least one pair of a wavelength tunable demultiplexing filter device and a wavelength tunable multiplexing filter device, the wavelength tunable demultiplexing filter device demultiplexes at least one of arbitrary wavelength components of wavelength-multiplexed light, and the wavelength tunable multiplexing filter device multiplexes light having the same wavelengths as the demultiplexed ones with residual wavelength-multiplexed light, wherein:

said wavelength demultiplexing filter device comprises:

a first optical filter element which has a plurality of filter chips arranged thereon which transmit at least one wavelength component of the wavelength-multiplexed light;

a first light emitting unit which emits the wavelength-multiplexed light into said first optical filter element from a specific direction;

a first light receiving unit which is located on the same optical axis as said first light emitting unit and receives the light transmitted through said first optical filter element;

a second light receiving unit which receives the light reflected at said first optical filter element;

a first moving unit which moves said first optical filter element in a direction relative to said filter chips so that the light from said first light emitting unit enters at least one different filter chip; and a first controller which controls said first moving unit in accordance with the wavelength component to be demultiplexed; and wherein said wavelength multiplexing filter device comprises:

a second optical filter element which has a plurality of filter chips arranged thereon which transmit at least one of wavelength components of the wavelength-multiplexed light;

a second light emitting unit which emits light having arbitrary wavelength components of the wavelength-multiplexed light into said second optical filter element from a specific direction;

a third light emitting unit which emits wavelength-multiplexed light excluding the wavelength components emitted by said second light emitting unit, into a position of said second optical filter element, where the transmitted component of said second light emitting unit through said second optical filter element is outputted so that light reflected by said filter chip overlaps with the transmitted component of the light from said second light emitting unit;

a third light receiving unit which is located on the same optical axis as said second light emitting unit and receives the light outputted through said second optical filter element and the light reflected from said third light emitting unit;

a second moving unit which moves said optical filter element in a direction of said arranged filter chips to input the light from said second and third light emitting units into different filter chips; and a second controller which controls said moving unit in accordance with a wavelengths to be multiplexed.

\* \* \* \* \*